United States Patent [19]

Liebing et al.

[11] 4,217,787
[45] Aug. 19, 1980

[54] GYROSCOPIC APPARATUS

[75] Inventors: Alan P. Liebing, West Linton; James N. G. Scott; Brian R. Shackleton, both of Edinburgh, all of Scotland

[73] Assignee: Ferranti Limited, Hollinwood, England

[21] Appl. No.: 803,641

[22] Filed: Jun. 6, 1977

[30] Foreign Application Priority Data

Jun. 8, 1976 [GB] United Kingdom ............... 23537/76

[51] Int. Cl.² ............................................. G01C 19/28
[52] U.S. Cl. ................................................... 74/5.6 D
[58] Field of Search ................ 74/5 R, 5.6 D, 5.6 E

[56] References Cited

U.S. PATENT DOCUMENTS

| 2,606,310 | 8/1952 | Baker | 74/5.6 D X |
|---|---|---|---|
| 2,925,590 | 2/1960 | Boltinghouse et al. | 74/5.6 D X |
| 3,251,233 | 5/1966 | Duncan et al. | 74/5.6 D X |
| 3,439,556 | 4/1969 | Wing | 74/5.6 D |
| 3,444,745 | 5/1969 | Wing | 74/5.6 D |
| 3,452,609 | 7/1969 | Goodhue et al. | 74/5.6 E |
| 3,557,629 | 1/1971 | Quermann | 74/5.6 D |
| 3,918,310 | 11/1975 | Evans et al. | 74/5.6 D |

FOREIGN PATENT DOCUMENTS 2725197 12/1977 Fed. Rep. of Germany ......... 74/5.6 D
1058780 2/1967 United Kingdom.

Primary Examiner—Rodney H. Bonck
Attorney, Agent, or Firm—Kerkam, Stowell, Kondracki & Clarke

[57] ABSTRACT

A free rotor gyroscope has a gimbal supported for limited rotation about a rotatable shaft by a first flexure suspension and a rotor attached to the gimbal by a second flexure suspension. Pickoff means rotate with the gimbal and detect its movements about its axis of suspension.

8 Claims, 5 Drawing Figures

GYROSCOPIC APPARATUS

This invention relates to gyroscopic apparatus, and in particular to gyroscopes of the type usually called "free rotor gyroscopes".

Free rotor gyroscopes having a relatively large and heavy rotor connected to a drive shaft by a universal joint permitting relative tilting between the rotor and shaft are well known. When the rotor is rotated at high speed it tends to maintain a fixed orientation in space despite movement of the drive shaft about the two axes perpendicular to the spin axis of the drive shaft. The change in the relative positions of the rotor and drive shaft may be measured by suitable forms of pick-off, in the form of a steady state signal for a particular relative alignment. If this steady state signal is to indicate a particular deflection of the rotor from the condition when it is in a plane perpendicular to the spin axis then this null position must be arranged to give zero pick-off output. This makes it necessary to trim the pick-off, a procedure which is often costly in time and electrical components.

It is an object of the invention to provide gyroscopic apparatus of the free-rotor type which has a simpler pick-off arrangement than has hitherto been possible.

According to the present invention there is provided gyroscopic apparatus which includes a rotatable shaft, a gimbal attached to the shaft by a flexure suspension allowing limited rotation of the gimbal relative to the shaft about an axis perpendicular to the spin axis of the shaft, a rotor attached to the gimbal by a further flexure suspension allowing limited rotation of the rotor relative to the gimbal about an axis perpendicular to the spin axis of the shaft and to the axis of rotation of the gimbal, and pick-off means rotatable with and spaced from the gimbal and responsive to rotational movements of the gimbal about its axis of suspension to deliver output signals representing the sense and magnitude of such movements.

Preferably the pick-off means comprise conductive areas located on each side of the gimbal to which a d.c. polarising voltage may be applied.

An embodiment of the invention will now be described with reference to the accompanying drawings, in which.

Figure 1:
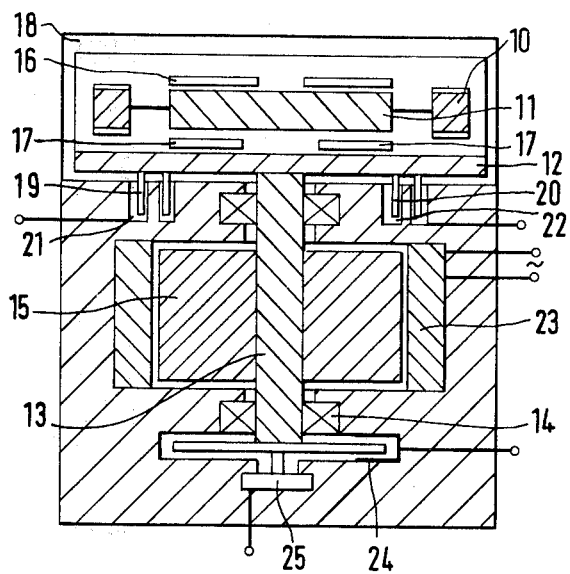
FIG. 1 is a schematic side view of a gyroscope.

Referring now to FIG. 1, a gyroscope according to the invention has an annular rotor 10 pivoted about a diameter on a gimbal member 11. The gimbal member is itself pivoted about a perpendicular axis relative to a base plate 12 which is secured to a rotatable shaft 13. The shaft 13 is supported in bearings 14 and carries the rotor 15 of the gyro spin motor. Mounted above and below the gimbal are upper and lower conductive plates 16 and 17 respectively secured to the base plate 12 and hence rotatable with it and with the gimbal 11. A cover 18 is attached to the base plate 12 to cover the rotor 10 and gimbal 11, and the enclosure is usually evacuated and sealed.

Each of the upper conductive plates 16 is connected to the diametrically opposed lower conductive plate 17, and each pair of plates is connected to one of two separate metal rings 19 and 20 which rotate in grooves 21 and 22 in the body of the gyroscope. The grooves are lined with electrically conductive material which are connected to the necessary circuitry, to be described later.

The body of the gyroscope also carries the stator 23 of the spin gyro motor, and a pick-off 24 used to indicate the angular position of the shaft 13 and the gimbal 11. An electrical connection, used to apply a d.c. polarising voltage, is made through a brush 25 to the rotating assembly.

Figure 2:
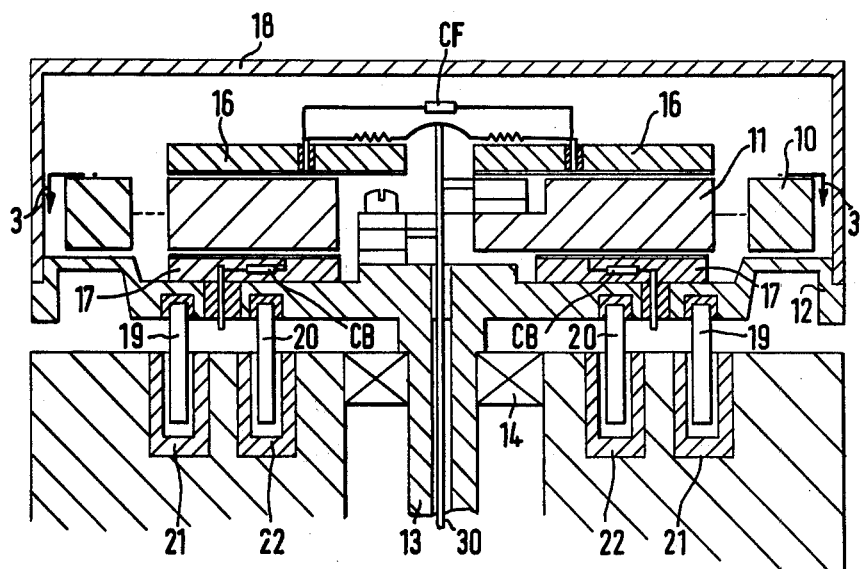
FIG. 2 is a sectional side view of part of the gyroscope of FIG. 1.
Figure 3:
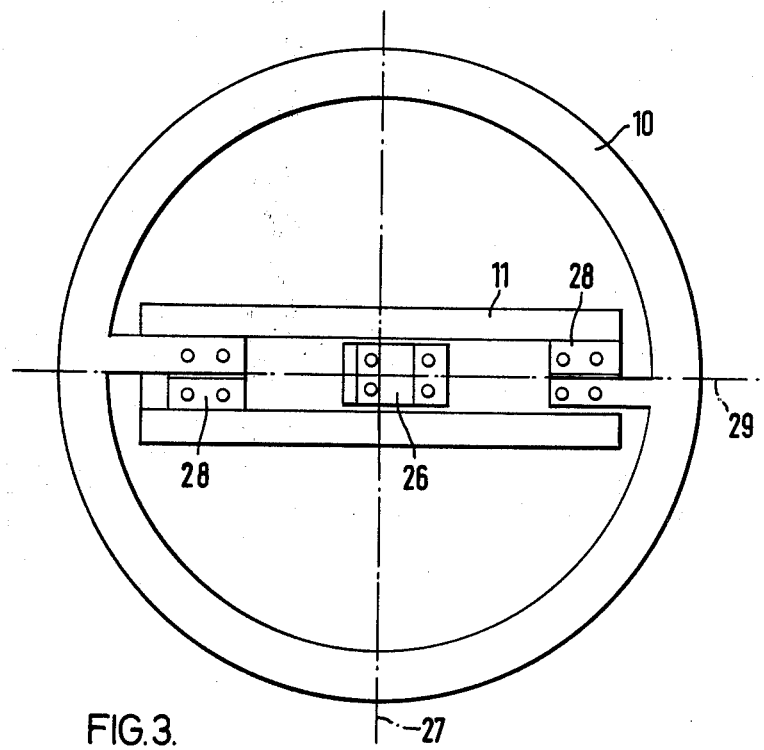
FIG. 3 is a plan view in the direction 3—3 of FIG. 2.

FIGS. 2 and 3 show the construction of the main parts of the gyroscope in greater detail. The same reference numbers are used as in FIG. 1, where appropriate.

As shown in FIGS. 2 and 3 the gimbal 11 is supported on the base plate 12 by a crossed-spring suspension 26, which allows the gimbal to pivot about the axis 27 shown in FIG. 3. The suspension may conveniently be of the type described and claimed in our U.S. Pat. No. 3,620,088. A similar suspension is used to provide two supports 28 for the rotor 10, allowing it to pivot about the axis 29 relative to the gimbal 11. The upper conductive plates 16 and lower conductive plates 17 are provided by conductive metallic layers deposited on ceramic plates. Each of the lower plates 17 is connected through a separate blocking capacitor CB to a different one of the rings 19 and 20. These rings do not make contact with their respective grooves 21 and 22; but the electrical output is transmitted by capacitive coupling between the two.

A polarising d.c. voltage is applied via a connection 30 and two feeder resistors R to the two pairs of interconnected conductive plates 16 and 17. In addition the two upper plates are connected together through a bootstrap capacitor CF.

Figure 4:
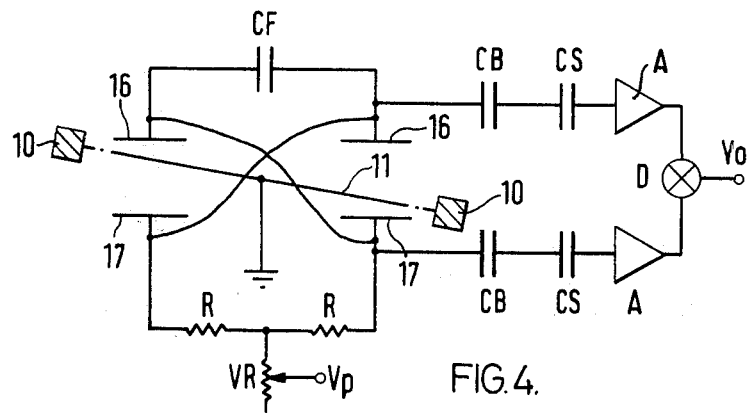
FIG. 4 is a circuit diagram of the pick-off and polarising circuits.

FIG. 4 illustrates the electrical connections and components of the gyroscope. The rotor 10 and gimbal 11 are shown schematically in a displaced position relative to the ceramic plates. The gimbal 11 is connected to the body of the gyroscope (i.e. to gound) by way of the hinge 26 and the bearings 14. The d.c. polarising voltage $V_p$ may be adjusted by a variable resistor VR and is applied through the feeder resistors R to the interconnected conductive plates 16 and 17. The bootstrap capacitor CF is connected between the upper areas as shown. Each pair of interconnected conductive plates is connected through the blocking capacitors CB to separate capacitive slip-rings, represented by capacitors CS in FIG. 4. The slip rings are connected to buffer amplifiers A, the outputs of which are connected to a differencing circuit D which gives an output Vo.

Mechanically, the gyroscope operates in a well-known manner. The gyro motor rotates the shaft 13, and hence the gimbal, rotor and associated components at a suitable high speed. The rotor 10 tends to maintain a fixed orientation in space, and hence any displacement of the body of the gyroscope causes the gimbal 11 to oscillate relative to the base plate 12 as it rotates. Each pair of the conductive plates 16 and 17 forms a capacitor with the earthed gimbal moving between the electrodes of each capacitor. These capacitors are charged by the polarising voltage $V_p$ through the resistors R, which are of high value to prevent the charge on the capacitors from being attenuated by the resistors. The blocking capacitors CB prevent the d.c. polarisation from being applied to the slip-rings.

When the gimbal is static relative to the conductive areas 16 and 17, whatever its actual distance from the conductive plates, there is no electrical output from the gyroscope. However, when the rotor is off-set, the gimbal oscillates at a frequency equal to the spin frequency of the shaft 13. Hence the earthed gimbal moves sinusoidally between the plates of the capacitors and produces an a.c. modulation of the d.c. polarising voltage. The output voltage Vo is given by $$V_o = \theta_x \cos wt + \theta_y \sin wt$$

where $\theta_x$ and $\theta_y$ are the rotor angular displacements about perpendicular axes relative to the case of the gyro, and w is the spin rate. This signal can be resolved into X and Y components with the aid of a timing signal indicating the angular position of the shaft, obtained from pick-off 24.

The pick-off system described above, operating as it does by detecting the oscillation of the gimbal, develops an a.c. signal which may be capacitively coupled to the exterior of the gyroscope. This is obviously a more satisfactory situation than the known arrangement which detect steady displacement of the rotor and require an a.c. excitation voltage to enable the output to be extracted from the rotating parts of the gyro. In addition, as already stated, the pick-off system described above is insensitive to initial errors in the location of the gimbal, and such errors do not have to be trimmed out. Similarly any gradual changes in location of the parts will not develop any error.

The use of the d.c. polarising voltage has a further advantage, in that it may be used to provide electrostatic back-off of the stiffness of the suspension hinges 26 supporting the gimbal 11. It is known that a partial cancellation of the spring stiffness has the advantage that a relatively stiff spring may support a heavy rotor without the large restoring torques which such a spring would normally exert. It is possible to cancel the spring torque completely, by adjusting the value of the d.c. polarising voltage.

The boostrap capacitor CF is necessary to ensure that the total electrical charge in the capacitor circuit remains constant whilst allowing charge to transfer from one side of the capacitor circuit to the other as the gimbal oscillates. This produces an a.c. modulation. The capacitor CF also ensures that the electrostatic negative spring stiffness is unaffected by small changes in the voltage across the pick-off capacitors formed by the conductive plates 16 and 17.

As already stated, the output from the pick-off system is in the form $$V_o = \theta_x \cos wt + \theta_y \sin wt$$

The output must be processed to give the rotor angular displacement $\theta_x$ and $\theta_y$ relative to the gyro case. The output signal may contain unwanted noise components at multiples of the spin frequency w and these should be suppressed if possible. The most convenient way of obtaining only the desired components is to use two three-level phase sensitive rectifiers, locked to the rotor spin frequency w and phased 90° apart.

Figure 5:
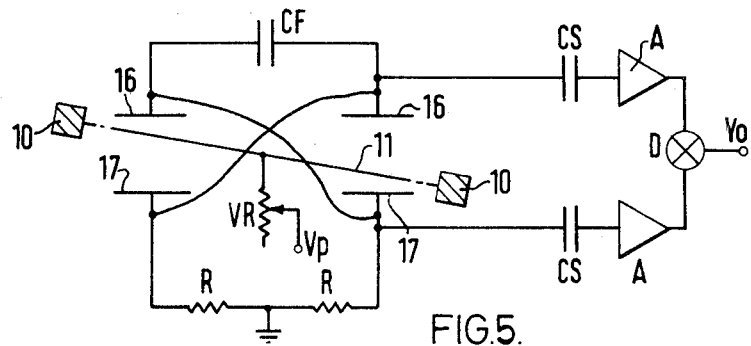
FIG. 5 is an alternate electrical circuit to that of FIG. 4.

FIG. 5 shows an alternative electrical circuit to that of FIG. 4 in which the gimbal 11 is insulated from the base plate 12 and has the polarising voltage $V_p$ applied to it. The blocking capacitors CB are now no longer necessary and are omitted, and the resistors R are connected to earth to provide leakage resistance to maintain the average potential on the conductive plates at the same level as the base plate.

What is claimed is:

1. Gyroscopic apparatus which includes a rotatable shaft, a gimbal attached to the shaft by a flexure suspension allowing limited rotation of the gimbal relative to the shaft about an axis perpendicular to the spin axis of the shaft, a rotor attached to the gimbal by a further flexure suspension allowing limited rotation of the rotor relative to the gimbal about an axis perpendicular to the spin axis of the shaft and to the axis of rotation of the gimbal, and pick-off means rotatable with and spaced from the gimbal and responsive to rotational movements of the gimbal about its axis of suspension to deliver output signals representing the sense and magnitude of such movements.

2. Apparatus as claimed in claim 1 in which the pick-off means comprises two pairs of electrically-conductive plates located on opposite sides of the gimbal such that the gimbal is free to move to a limited extent between each pair of plates as it rotates about its axis of suspension, an electrical interconnection between each plate of a pair and the opposite plate of the other pair, and a capacitor connected between the two interconnected pairs of plates.

3. Apparatus as claimed in claim 2 in which the gimbal is electrically connected to the rotatable shaft and which includes two feed resistors connected between the opposite ends of the capacitor and a source of a d.c. polarising voltage, the pick-off output being obtained from the two interconnected pairs of plates by way of blocking capacitors.

4. Apparatus as claimed in claim 3 in which the gimbal is electrically insulated from the rotatable shaft and connected to a source of a d.c. polarising potential, each end of the capacitor being connected through a resistor to the said shaft, the pickoff output being obtained directly from the two interconnected pairs of plates.

5. Apparatus as claimed in claim 3 which includes a pair of capacitive slip-rings by which the pick-off output is transferred from the rotatable pick-off to the body of the gyroscope.

6. Apparatus as claimed in claim 4 which includes a pair of capacitive slip-rings by which the pick-off output is transferred from the rotatable pick-off to the body of the gyroscope.

7. Apparatus as claimed in claim 3 which includes means for adjusting the d.c. polarising voltage to offset at least part of the torque exerted by the first flexure suspension.

8. Apparatus as claimed in claim 4 which includes means for adjusting the d.c. polarising voltage to offset at least part of the torque exerted by the first flexure suspension.

* * * * *